3,083,140
N - [p - (3,3 - DISUBSTITUTED - 1 - AZETIDINYL-
ETHOXY) - BENZOYL] - 3,4,5 - TRIMETHOXY-
BENZAMIDE AND PHARMACEUTICAL COM-
POSITIONS THEREOF
Emilio Testa, San Simone, Vacallo, Ticino, Switzerland,
  assignor to Lepetit S.p.A., Milan, Italy
No Drawing. Filed Mar. 8, 1961, Ser. No. 94,153
Claims priority, application Great Britain Mar. 18, 1960
8 Claims. (Cl. 167—65)

The present invention is concerned with pharmacologically active compounds and a process for their preparation. More particularly this invention relates to N-[p-(3,3 - disubstituted - 1 - azetidinylethoxy) - benzyl] - 3,4,5-trimethoxybenzamide of the formula

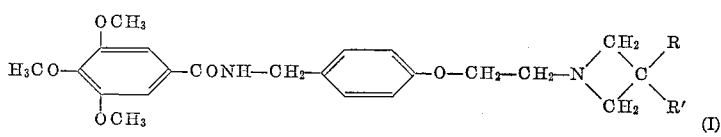

wherein R and R' are the same or different and represent lower alkyl radicals.

The compounds of the invention are useful as antihistaminic and antiemetic agents. For instance, the compound of the above formula in which R and R' are both methyl shows a low degree of toxicity, the $LD_{50}$ being in mice about 900 mg./kg./per oz., 600 mg./kg. intraperitoneally and 110 mg./kg. intravenously. In dogs, this compound, when administered subcutaneously in doses of 25–30 mg./kg., affords complete protection against vomiting caused by a subcutaneous injection of apomorphine hydrochloride 0.1 mg./kg. A good protection is also obtained with 20 mg./kg. By oral route, complete protection is afforded by about 50 mg./kg., and a good degree of protection by 40 mg./kg. In comparison with known antiemetic substances, the compound of the invention shows the advantage of causing no undesirable side effects. For instance, it does not possess anticholinesterasic activity, shown by many compounds of similar structure.

The process for preparing compounds having the general Formula I comprises reacting p-hydroxy-benzylamine with trimethoxybenzoic acid chloride in an inert organic solvent in the presence of a tertiary amine which may be aliphatic or heterocyclic, filtering the precipitated N-(p-hydroxybenzyl)-3,4,5-trimethoxybenzamide and heating at 65–70° an alkali metal salt of said N-(p-hydroxybenzyl)-3,4,5-trimethoxybenzamide with an N-chloroethyl-3,3-dialkylazetidine in an inert organic solvent, evaporating the mixture to dryness, taking up the residue with an organic solvent, filtering off the inorganic salt, evaporating the solvent, taking up the residue with diethyl ether and precipitating the product from the diethyl ether solution by the addition of light petroleum.

The reaction scheme is as follows:

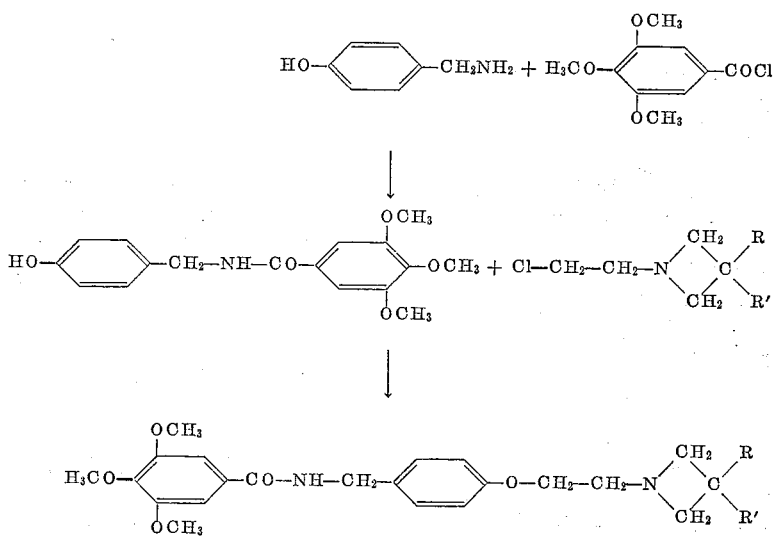

The N-chloroethyl-3,3-dialkylazetidine is prepared by adding a cold solution of 3,3-dialkylazetidine dropwise to a cold solution of ethylene oxide while keeping the mixture at about 0° under stirring, allowing the mixture to stand at room temperature for a few days, and distilling the residue obtained after evaporation of the organic solvent in vacuo.

A chloroform solution of 3,3-dialkyl-1-(β-hydroxyethyl)-azetidine is then treated with thionyl chloride at a temperature below 10°, the reaction mixture is heated at boiling point, then cooled, poured into ice, and the aqueous layer made alkaline with a solution of $Na_2CO_3$ and extracted with diethyl ether. The residue obtained after evaporation of the solvent is then distilled in vacuo.

The following example is illustrative of the invention.

EXAMPLE

1-(β-Hydroxyethyl)-3,3-Dimethylazetidine

To a solution of 48 g. of ethylene oxide in 250 ml. of anhydrous ethanol, a solution of 85 g. of 3,3-dimethylazetidine in 50 ml. of anhydrous ethanol is slowly added with stirring at about 0°. After two days at room temperature the solvent is removed and the residue distilled. Yield 80 g. (62%), B.P. 80–83°/24 mm.

1-(β-Chloroethyl)-3,3-Dimethylazetidine

To a solution of 25.8 g. of 1-(β-hydroxyethyl)-3,3-dimethylazetidine in 80 ml. chloroform, 38 g. of thionyl chloride are added at a temperature below 10°. The reaction mixture is heated at boiling point. After cooling the mixture is poured into ice, the aqueous layer washed with chloroform, made alkaline with a solution of $Na_2CO_3$ and extracted with diethyl ether. The residue obtained after evaporation of the solvent is then distilled in vacuo. Yield 20.3 g. (68%), B.P. 47–51°/24 mm.

N-(p-Hydroxybenzyl)-3,4,5-Trimethoxybenzamide

To a solution of 21 g. of p-hydroxybenzylamine in anhydrous pyridine, a solution of 39 g. of trimethoxybenzoic acid chloride in anhydrous benzene is added dropwise over a period of 15 minutes without exceeding 10°. The mixture is then stirred for 6 hours at room temperature. A yellow precipitate is obtained and separated by filtration. Yield 35 g. (65%), M.P. 227–229°.

N-[p-(3,3-Dimethyl-1-Azetidinylethoxy)-Benzyl]-3,4,5-Trimethoxybenzamide

A solution of 31.7 g. of N-(p-hydroxybenzyl)-3,4,5-trimethoxybenzamide in 250 ml. of isopropyl alcohol is added dropwise to a solution of 2.3 g. of sodium in 250 ml. of isopropyl alcohol at 65–70°. The mixture is stirred for about 30 minutes, then 16 g. N-chloroethyl-3,3-dimethylazetidine are added dropwise and the mixture is stirred at the same temperature for 5 hours. The organic solvent and the excess of the free base are evaporated in vacuo, the residue is taken up with acetone and NaCl filtered off. The solvent is then evaporated and the residue taken up with diethyl ether, the undissolved portion is filtered off and the solution concentrated to about 15 ml. By the addition of petroleum ether a precipitate forms which is collected. Yield 28 g. (54%), M.P. 95–97°.

I claim:

1. An N-[p-(disubstituted-1-azetidinylethoxy)-benzyl]-3,4,5-trimethoxybenzamide of the formula

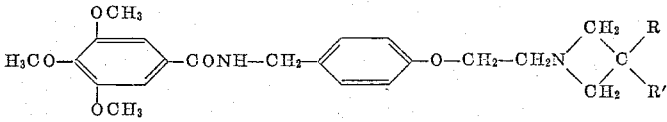

wherein R and R' are lower alkyl.

2. N-[p-(3,3-dimethyl-1-azetidinylethoxy)-benzyl]-3,4,5-trimethoxybenzamide.

3. A pharmaceutical composition in dosage unit form, comprising from 0.01 to 1 gram of an N-[p-(3,3-disubstituted-1-azetidinylethoxy)-benzyl]-3,4,5-trimethoxybenzamide of the formula

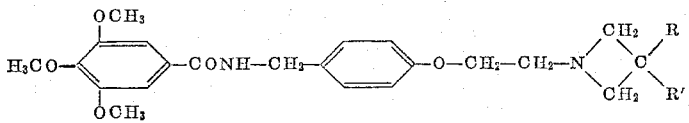

wherein R and R' are lower alkyl, and a suitable pharmaceutical carrier.

4. A pharmaceutical composition in dosage unit form comprising from 0.01 to 1 gram of the compound of claim 1 together with a solid carrier.

5. A pharmaceutical composition in dosage unit form comprising from 0.01 to 1 gram of the compound of claim 1 together with a liquid diluent.

6. A pharmaceutical composition in dosage unit form comprising from 0.01 to 1 gram of an N-[p-(3,3-dimethyl-1-azetidinyl)-benzyl]-3,4,5-trimethoxybenzamide together with a suitable diluent.

7. A pharmaceutical composition in dosage unit form comprising from 0.01 to 1 gram of an N-[p-(3,3-dimethyl-1-azetidinyl)-benzyl]-3,4,5-trimethoxybenzamide together with a solid pharmaceutical carrier.

8. A pharmaceutical composition in dosage unit form comprising from 0.01 to 1 gram of an N-[p-(3,3-dimethyl-1-azetidinyl)-benzyl]-3,4,5-trimethoxybenzamide together with a liquid diluent.

References Cited in the file of this patent

UNITED STATES PATENTS

| | | |
|---|---|---|
| 2,870,145 | Perron | Jan. 20, 1959 |
| 2,870,146 | Perron | Jan. 20, 1959 |
| 2,879,293 | Goldberg et al. | Mar. 24, 1959 |

OTHER REFERENCES

Richter: Organic Chemistry, volume 4, page 5 (1947).
Testa et al.: Annalen, volume 635, pages 119–27 (1960).